United States Patent [19]

Kornbaum

[11] 4,243,627

[45] Jan. 6, 1981

[54] PROCESS FOR MANUFACTURING THERMOPLASTIC COMPOSITIONS AND CONTAINERS MADE OF SUCH COMPOSITIONS

[75] Inventor: Simon Kornbaum, Caluire, France

[73] Assignee: Ato Chimie, Courbevoie, France

[21] Appl. No.: 8,082

[22] Filed: Jan. 31, 1979

Related U.S. Application Data

[62] Division of Ser. No. 844,310, Oct. 21, 1977.

[30] Foreign Application Priority Data

Oct. 29, 1976 [FR] France ................................ 76 32792

[51] Int. Cl.$^3$ .............................................. B29D 7/04
[52] U.S. Cl. .................................... 264/171; 264/515; 264/564; 264/211; 264/349; 428/35; 428/518
[58] Field of Search .............. 264/171, 349, 211, 564, 264/515; 428/518, 35

[56] References Cited

U.S. PATENT DOCUMENTS

| | | | |
|---|---|---|---|
| 2,985,542 | 5/1961 | Pinsky et al. ........................... | 428/35 |
| 3,382,305 | 5/1968 | Breen ................................... | 264/171 |
| 3,548,048 | 12/1970 | Hughes et al. ......................... | 264/171 |
| 3,597,498 | 8/1971 | Christensen .......................... | 264/171 |
| 3,655,829 | 4/1972 | Ronzoni et al. ...................... | 264/171 |
| 3,697,367 | 10/1972 | Schwarz ............................... | 264/171 |
| 3,725,184 | 4/1973 | Scopp .................................. | 428/518 |
| 3,864,152 | 2/1975 | Kitamura et al. ...................... | 428/35 |
| 3,928,704 | 12/1975 | Heidingsfeld et al. .............. | 428/260 |

*Primary Examiner*—Jeffery R. Thurlow
*Attorney, Agent, or Firm*—Burgess, Ryan and Wayne

[57] ABSTRACT

A process for manufacturing thermoplastic materials having an elevated gas impermeability and/or improved physical properties. This process is characterized in that it comprises mixing at least partially incompatible polymers, gelling them by the combined action of heat, pressure and kneading. The gelled mixture is then subjected to laminar flow through substantially parallel surfaces in which the ratio of the length of the surfaces to the distance between them is greater than 10.

A thermoplastic material having increased gas impermeability as well as containers made out of said materials.

A packaging method in which the thermoplastic materials of the invention are used to package oxygen sensitive materials.

11 Claims, 1 Drawing Figure

PROCESS FOR MANUFACTURING THERMOPLASTIC COMPOSITIONS AND CONTAINERS MADE OF SUCH COMPOSITIONS

This is a division, of application Ser. No. 844,310, filed Oct. 21, 1977, pending in group (160).

BACKGROUND OF THE INVENTION

1. Field of the Invention

The invention concerns a process for manufacturing compositions of thermoplastic materials having an elevated gas impermeability and/or certain improved physical and mechanical properties which can be used for example in the field of packaging carbonated liquids.

2. Description of the Prior Art

Certain uses of plastic materials require a very high gas impermeability. It is also known that this impermeability is selective and that it varies unpredictably. The gas permeability coefficients of a given plastic material may differ enormously depending on the particular gas. It should likewise be noted that these differences can be complemented, for example a plastic material can be permeable to gas A and impermeable to gas B whereas the complementary material could be impermeable to gas A and permeable to gas B Thus it sems normal to combine these two materials in order to obtain a composition having a high impermeability coefficient with respect to both gases A and B.

It often occurs that the materials which one wants to combine are imcompatible. This results, for example, in the coextrusion of multilayered complexes, in a product which tends to peel apart quasi-spontaneously and is thus not suited for applications requiring a minimum amount of cohesion and adherence.

This manifests itself further when, for example, a mixture of incompatible polymers are extruded, in the manufacture of a product having a non-homogeneous structure of composition. This heterogenity can be seen with the naked eye or with a magnifying glass or occasionally with the aid of a high-power microscope. The product obtained thus has a structure which resembles that of an emulsion or of a solidified suspension having a continuous as well as a discontinuous phase. If the permeability of this product is measured, it is found that it is approximately that of the continuous phase. The benefit of the reduction in permeability which the polymer in the discontinuous phase would have been able to add, which would have been desirable for certain applications, is not achieved.

SUMMARY OF THE INVENTION

The aim of the invention is to provide a process of manufacturing compositions of thermoplastic materials having an increased gas impermeability which process can be performed in a simple and economical manner on early available current material.

In the process according to the invention, the polymers which are at least partially incompatable are mixed by any conventional or known means. The mixture is then gelled by the combined action of heat, pressure and kneading. The gelled mixture is then caused to flow laminarly between substantially parallel surfaces such as flat plate dies, annular dies or dies of any cross-sectional shape. The ratio of the lengths of these surfaces in the direction of the flow of the material and the distance between these surfaces being greater than about 10 and preferably greater than about 20. A mixture of polymers is thus obtained whose structure comprises a continuous phase and a discontinuous phase each containing a polymer or a mixture of polymers which are themselves compatible. The discontinuous phase has a generally lamellar form of low thickness in proportion to its length and width and is distributed throughout the continuous phase parallel to the major dimensions of the films, sheets, plates or parisons having a circular or any other cross-section when leaving the die.

According to one characteristic of the invention, the continuous phase includes polyvinyl chloride and the discontinuous phase includes a polyvinyl type alcohol or a copolymer which is composed primarily of a vinyl alcohol, the proportions of the mixture being 100 parts by weight of polyvinyl chloride per about 1 to 100, preferably about 5 to about 30 parts, by weight of polyvinyl alcohol. The value of K of the polyvinyl chloride is between about 50 and about 80, preferably between about 56 and 62. The extend of hydrolysis of the polyvinyl alcohol being between about 50 and 100%, preferably between about 80 and about 95%. The viscosity at 20° C. of a 4% aqueous solution of the polyvinyl alcohol solution being between about 2 and about 70 cP, preferably between 4 and 10 cP.

Naturally the mixture may also contain any conventional additives such as stabilizers, lubricants, coloring agents, agents which add shock resistance, etc., which may be added and are normally added during the manufacture of rigid polyvinyl chloride compounds.

One of the advantages of the process of the invention is the fact that it does not require a number of extruders or dies equal to the number of used polymers and binders.

Furthermore, it does not require successive operations by different machines such as the processes of coextrusion, overlaying, coating, pressing of the two layers, layer extrusion and other known processes of manufacturing products made out of plastic materials having a multilayered structure.

As used in this specification, the terms "polymer" and "plastic materials" are used to denote all natural or artificial macromolecular thermoplastic materials or such mterials which are obtained synthetically by polymerization, polycondensation or other chemical reactions whether they contain or not any of the diverse additives normally added for reasons of modification, use or economy.

In terms of the process, the term "incompatibility" as used throughout the specification is defined such that a polymer is considered to be partially or totally incompatible with another polymer if mixture of the two polymers in certain proportions and under certain mixing conditions results in plastic materials having a non-homogeneous structure or composition.

The phase "a mixture of polymers" is taken to mean a powdered, granular or solid mass containing two or more polymers after they were subjected to homogenizing processes, as particles or macromolecules, in machines normally used for these operations by the plastics industry such as: slow or fast mixers, internal or cylindrical kneaders, granulator-extruders, granulators, etc.

The process of the invention contemplates, preferably, the use of single screw, double screw, or multiple screw extruders having a planetary screw and/or a plate for the transformation of the mixtures into finished or semifinished products. Nevertheless, any other machine capable of bringing the mixture into the melted state and making it flow continuously or intermittently through a die or between close parallel surfaces may be used.

The laminar flow necessary for the formation of the lamellar structure is obtained by the passage of the melted material through one or several dies. The outlet of the die may be circular, linear or of any other profile or shape depending on the geometrical shape of the product which one wants to manufacture such as for example: hollow bodies having a cross-section which is cylindrical, oval or square, films and smooth or textured surfaces, etc. A significant consideration is the length, in the direction of flow, of the constant cross-sectional orifice segment of the die, also known as "die land", on which the creation of lamellar layers depends. The optimal length is a function of the rheoloical properties of the material being treated, the nature of the surface of the die, the flow rate of the material as well as other parameters which will be readily apparent and which are necessary to achieve the desired flow scheme.

A further aim of the inventio is to provide an improved thermoplastic material which comprises at least two polymers which are at least partially incompatible polymers. The material has a continuous and a discontinuous phase which each include a polymer or mixture of compatible polymers. The discontinuous phase is in the form of lamellar layers which are relatively thin with respect to their length and width and are distributed in the continuous phase parallel to the major dimensions of the thermoplastic material.

In a particular embodiment of the invention the continuous phase includes polyvinyl chloride and the discontinuous phase includes a polyvinyl alcohol or a copolymer composed primarily of polyvinyl alcohol, the ratio of PVC to polyvinyl alcohol being between about 100:1 and about 1:1.

In a preferred embodiment of the invention, the K value of the polyvinyl chloride is between about 50 and about 80, the extent of hydrolysis of the polyvinyl alcohol is between about 50 and 100% and the viscosity of the polyvinyl alcohol used in a 4% aqueous solution is between about 2 and about 70 cP.

A further aim of the invention is the fabrication of a container made out of the material discussed above which may be used for edibles as well as non-edibles.

The invention has furthermore as an object a container made out of the material described above which contains a carbonated liquid.

Finally, an object of the invention is to provide a method of protecting an oxygen sensitive material by packaging it in a container made out of the material of the invention.

BRIEF DESCRIPTION OF THE DRAWING

FIG. 1 illustrates by way of exemple a microphotograph magnified 50 times of a section of the wall of an extruded flask when using the composition of the invention which has been treated in boiling water in order to make the lamellar structure visible.

The following examples, set forth merely for purposes of illustration, demonstrate the performance and applications of the process.

DETAILED DESCRIPTION OF THE INVENTION

EXAMPLE 1

Mixtures 1, 2 and 3 are prepared as follows:

| COMPONENTS | Mixture No 1 | No 2 | No 3 |
|---|---|---|---|
| | (parts by weight) | | |
| PVC suspension, homopolymer having a value of K = 57 | 100 | 100 | 100 |
| PVAL[1] | 0 | 20 | 30 |
| PARALOID ® K 120 N | 1 | 1 | 1 |
| thio-tin stabiizer (solid) | 0.3 | 0.3 | 0.3 |
| CIRE OP ® lubricant | 0.3 | 0.3 | 0.3 |

[1]Poly-(vinyl alcohol) having the following characteristics:
- Viscosity in a 4% aqueous solution    5 cP
- Extent of hydrolysis    88 mole %
- Degree of polymerization    550

The PVAL is dried under vacuum before being used.

The mixing takes place in a rapid Papenmeier mixer until the temperature reaches 90° C.

One part of each of the mixtues is kneaded in a mixer having cylinders heated to a temperature of 180° C. for 5 minutes at the end of which, sheets, having a thickness of 0.5 mm, are drawn out.

The sheets are pressed to form plates having a thickness of 0.1 mm for the measurement of permeability to $O_2$ and $CO_2$.

The pressing of the plates is effected by a 100 mm compression type press made by LESCUYER and VILLENEUVE. The conditions during compression are as follows:
- Temperature of the plates: 180° C.
- Preheated for two minutes
- Pressing for 4 minutes at 200 bars pressure.

It is observed, and the results of the measurements given below confirm, that the technique of drawing and pressing the plates does not in and of itself result in a composition having a lamellar structure.

Another portion of the mixture is transformed into 250 cc flasks by blower extrusion with a HESTA model B33 S11 machine, equipped with a simple straight head and a circular die tube with a gap or clearance at the outlet of 1.5 mm and a die-land of 45 mm which thus corresponds to a ratio such as was defined hereinabove of 30/1.

The conditions of blower extrusion are:
- temperature profile from the inlet to the outlet 165°-160°-165°-155°-200° C.
- screw speed: 60 rpm
- air blower pressure: 3 bars
- cycle: 11 seconds The walls of the flask having a thickness of approximately 0.65 mm obtained from mixtures 2 and 3 (but not those obtained from mixture 1) have a lamellar structure visible under the microscope when cut with scissors or by crushing the flasks by hand.

Plates of 0.1 mm are made from the walls of the flasks in the same manner as those made from the sheets of the cylinder mixer.

Measurement of the permeability to $O_2$ and $CO_2$ at 22° C. are made in the following manner.

The measurement cell is divided into two compartments by the plate whose permeability is to be measured. The testing gas is present in one of the compartments at a pressure of 4 bars while the other compartment is swept with pure nitrogen. The gas going through the plate is entrained by the nitrogen and measured.

The measurement is carried out as follows:

With respect to the oxygen, a HERSCH battery is used in which the lead-platinum electrodes are separated by a porous wall saturated with a potassium solution. The oxygen is transformed at the cathode into negative hydroxyl ions which are discharged towards the anode. The current which passes between the two electrodes is thus proportional to the quantity of oxygen present.

The $CO_2$ is measured by an apparatus of the COSMA Corporation which is based on the principle of infra-red radiation absorption.

The results of the permeability measurements are set forth in Table 1.

TABLE 1

| PLATES ARE MADE OF MIXTURES | PERMEABILITY, P $10^{10}$ $cm^3 \cdot mm/cm^2 \cdot sec \cdot cmHg$ | |
|---|---|---|
| | of $O_2$ | of $CO_2$ |
| No 1 kneaded into sheets | 0.58 | 1.06 |
| No 1 extruded into flasks | 0.50 | 1.05 |
| No 2 kneaded into sheets | 0.38 | 0.70 |
| No 2 extruded into flasks | 0.06 | 0.07 |
| No 3 kneaded into sheets | 0.32 | 0.50 |
| No 3 extruded into flasks | 0.05 | not measurable |

The plates made out of the flasks having the lamellar structures, exhibit permeabilities significantly below those of plates made out of sheets obtained from the cylinder mixer. In effect, for the sheets obtained from the cylindrical mixer, the laminar flow condition is not fulfilled and there is thus no lamellar structure despite the relatively significant quantities of PVAL in mixtures 2 and 3. As a result, the $O_2$ and $CO_2$ permeability is only slightly below that of mixture 1 which contains no PVAL.

EXAMPLE 2

A series of seven mixtures containing different volumetrical fractions of PVAL (V') and PVC (V") as shown in table 2, is prepared. The mixtures further contain: 1 pcr of Paraloid ® K 120 N, 0.3 pcr of solid thio-tin stabilizer and 0.3 pcr of Cire CP ® lubricant.

The mixture of the components and the transformation of the mixtures into 250 cc flasks by blower extrusion are effected by the devices and under the conditions of example 1.

Table 2 sets forth the oxygen permeabilities, measured according to the method described above. Table 3 sets forth the modulus of elasticity in flexion and traction the Vicat point under 5 kg for some of the mixtures.

TABLE No 2

| Mixture Number | V' | V" | $PO_2 \cdot 10^{10}$ in $\frac{cm^3 \cdot mm}{cm^2 \cdot sec \cdot cmHg}$ | |
|---|---|---|---|---|
| 4 | 0.0 | 0.978 | 0.43 | 0.50 |
| 5 | 0.011 | 0.967 | 0.37 | 0.45 |
| 6 | 0.052 | 0.927 | 0.26 | 0.37 |
| 7 | 0.098 | 0.881 | 0.14 | 0.19 |
| 8 | 0.141 | 0.840 | 0.08 | 0.12 |
| 9 | 0.180 | 0.802 | 0.11 | 0.12 |
| 10 | 0.247 | 0.736 | 0.08 | 0.15 |

The slightly elevated values of $PO_2$ to the right of the column correspond to the flasks made by blower extrusion of recycled material. Materials rejected in the course of manufacturing can thus be reused while preserving to a significant extent their increased $O_2$ impermeability.

TABLE No 3

| Characteristics | Units of Measurement | MIXTURE No | | | |
|---|---|---|---|---|---|
| | | 4 | 7 | 9 | 10 |
| Modulus of elasticity (flexion) | Kgf/cm² | 30 700 | 31900 | 33200 | 36 300 |
| Modulus of elasticity (traction) | " | 26 600 | — | 28200 | 30 400 |
| Vicat point under 5 Kgf | °C. | 80 | 80 | 80 | 80 |

The increase in the modulus of elasticity is of particular significance when packaging carbonated beverages in PVC bottles since it assures a greater dimensional stability. As a result, thinner bottle walls may be used which of course results in the use of less material and in lower cost.

The increase in $O_2$ impermeability is evidenced likewise by measurements performed directly on the 250 cc flasks made by blower extrusion. The measurement method used is that described by Calvano et al in *Modern Packaging*, Nov. 1968, pages 143–145. The average thickness of the walls of the flasks was approximately 0.65 mm. Table 4 sets forth the $O_2$ permeability coefficients ($PO_2$), determined by this method.

TABLE No 4

| Mixture Number | $PO_2 \cdot 10^{10} \frac{cm^3 \cdot mm}{cm^2 \cdot sec \cdot cmHg}$ |
|---|---|
| 4 | 0.55 |
| 8 | 0.037 |
| 9 | 0.022 |
| 10 | not measurable |

The $PO_2$ coefficients of mixtures 8, 9 and 10 obtained by direct measurement on the flasks are substantially less than those of Table 2 which were measured on pressed plates having a thickness of 0.1 mm. The difference may possibly be due to the non-linearity of the coefficients as a function of thickness as a result of the lamellar structure of the material. In effect, it is possible that as the number of lamellar interfaces increases with increasing thickness, supplemental resistance is produced on the passage of the molecules of gas. This may be due to the progressive decrease in the pressure gradient across the lamellar material.

Examples 1 and 2 show quite clearly that in the case of PVC the process of the invention makes it possible to improve the gas impermeability and modulus of elasticity of the PVC. These properties are of course of primary significance when packaging materials which are oxygen sensitive or which contain carbon dioxide gas in PVC containers capable of maintaining their structural integrity.

The specification, the drawing and the examples present a detailed disclosure of the invention. It is to be understood however that the invention is not limited to the specific methods, of manufacture, of methods of use, compositions and articles specifically disclosed but extends instead to all modifications and alternatives falling within the scope of the invention as it is defined by the claims.

I claim:

1. A process of manufacturing a sheet-like thermoplastic structure having a reduced permeability to gases comprising a continuous phase consisting essentially of polyvinyl chloride and a discontinuous phase consisting essentially of polyvinyl alcohol, incompatible with the polyvinyl chloride phase, comprising lamellar layers distributed in the continuous polyvinyl chloride phase parallel to the surface of said sheet-like structure, which comprises:
   (a) mixing polyvinyl chloride with polyvinyl alcohol to provide a polymer mixture;
   (b) gelling said mixture under the combined effects of pressure and heat, and
   (c) extruding the gelled mixture by subjecting the gelled mixture to laminar flow through at least one die, said die providing between a die inlet and a die outlet a flow path for said mixture, at least a portion of which flow path is defined by the interval between two spaced parallel surfaces, the ratio of the length of said surfaces in the direction of flow to the distance between said surfaces being greater than 10.

2. The process of claim 1, wherein said ratio of the length of said parallel surfaces to the distance therebetween is greater than 20.

3. The process of claim 1 or 2, wherein said die outlet has a rectangular configuration.

4. The process of claim 1 or 2, wherein said die outlet has an annular configuration.

5. The process of claim 1 or 2, wherein said polymer mixture is prepared by mixing 100 parts by weight of polyvinyl chloride with about 5 to 30 parts by weight of polyvinyl alcohol.

6. The process of claim 1 or 2, wherein the K value of the polyvinyl chloride is comprised between about 50 and about 80, the extent of hydrolysis of the polyvinyl alcohol being comprised between about 50% and about 100%, and the viscosity of a 4% aqueous solution of the polyvinyl alcohol being comprised between about 2 cP and about 70 cP.

7. The process of claim 5, wherein the K value of the polyvinyl chloride is comprised between about 50 and about 80, the extend of hydrolysis of the polyvinyl alcohol being comprised between about 50% and about 100%, and the viscosity of a 4% aqueous solution of the polyvinyl alcohol being comprised between about 2 cP and about 70 cP.

8. The process of claim 1, further comprising the step of incorporating in said polymer mixture at least one of the compounds selected from the group consisting of stabilizers, lubricants, coloring agents and shock resisting agents.

9. The process of claim 5, further comprising the step of incorporating in said polymer mixture at least one composition selected from the group consisting of stabilizers, lubricants, coloring agents and shock resisting agents.

10. The process of claim 6, further comprising the step of incorporating in said polymer mixture at least one composition selected from the group consisting of stabilizers, lubricants, coloring agents and shock resisting agents.

11. The process of claim 7, further comprising the step of incorporating in said polymer mixture at least one composition selected from the group consisting of stabilizers, lubricants, coloring agents and shock resisting agents.

* * * * *

UNITED STATES PATENT AND TRADEMARK OFFICE
CERTIFICATE OF CORRECTION

PATENT NO. : 4,243,627
DATED : Jan. 6, 1981
INVENTOR(S) : Simon Kornbaum

It is certified that error appears in the above—identified patent and that said Letters Patent is hereby corrected as shown below:

Column 2, line 43: "mterials" should be --materials--.

line 55: "phase" should be --phrase--.

Column 3, line 21: "inventio" should be --invention-- line 56: "exemple" should be --example--.

Column 6, line 1: "increaaed" should be --increased--.

Signed and Sealed this

Fourth Day of August 1981

[SEAL]

Attest:

GERALD J. MOSSINGHOFF

Attesting Officer     Commissioner of Patents and Trademarks